(12) United States Patent
Ko et al.

(10) Patent No.: US 10,349,398 B2
(45) Date of Patent: Jul. 9, 2019

(54) NON-ORTHOGONAL TRANSMISSION METHOD AND APPARATUS IN COMMUNICATION SYSTEM

(71) Applicant: ELECTRONICS AND TELECOMMUNICATIONS RESEARCH INSTITUTE, Daejeon (KR)

(72) Inventors: Young Jo Ko, Daejeon (KR); Ok Sun Park, Daejeon (KR); Chan Ho Yoon, Daejeon (KR); Gi Yoon Park, Daejeon (KR); Seung Kwon Baek, Daejeon (KR); Woo Ram Shin, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/800,058

(22) Filed: Oct. 31, 2017

(65) Prior Publication Data

US 2018/0124756 A1    May 3, 2018

(30) Foreign Application Priority Data

Nov. 1, 2016   (KR) .................. 10-2016-0144773
Sep. 15, 2017   (KR) .................. 10-2017-0118934

(51) Int. Cl.
*H04W 72/04*   (2009.01)
*H04L 5/00*   (2006.01)
(Continued)

(52) U.S. Cl.
CPC ......... *H04W 72/042* (2013.01); *H04L 5/0005* (2013.01); *H04L 25/0202* (2013.01);
(Continued)

(58) Field of Classification Search
CPC ............. H04W 72/0413; H04W 72/14; H04W 72/1284; H04W 72/04; H04W 72/0473;
(Continued)

(56) References Cited

U.S. PATENT DOCUMENTS

| 9,553,660 B2 | 1/2017 | Kishiyama |
| 2012/0002740 A1* | 1/2012 | Han .................. H04L 5/0048 375/260 |

(Continued)

FOREIGN PATENT DOCUMENTS

WO    WO-2016/200066 A1    12/2016

OTHER PUBLICATIONS

Qualcomm Incorporated, "RSMA", 3GPP TSG-RAN WG1 #85, May 23-27, 2016, Nanjing, China, R1-164688.
(Continued)

*Primary Examiner* — Jaime M Holliday
(74) *Attorney, Agent, or Firm* — Rabin & Berdo, P.C.

(57) ABSTRACT

An operation method of a first terminal in a communication system may comprise receiving, from a base station, a control message including information on a resource allocated for a transmission indicator used for identifying the first terminal among a plurality of terminals performing uplink transmission; transmitting the transmission indicator to the base station using the resource allocated for the transmission indicator; and after transmitting the transmission indicator, transmitting an uplink signal to the base station using a preconfigured resource without an uplink grant.

19 Claims, 6 Drawing Sheets

(51) Int. Cl.
  *H04W 24/08* (2009.01)
  *H04L 25/02* (2006.01)
  *H04W 72/12* (2009.01)
  *H04W 72/14* (2009.01)
  *H04W 48/12* (2009.01)

(52) U.S. Cl.
  CPC ............ *H04W 24/08* (2013.01); *H04W 48/12* (2013.01); *H04W 72/04* (2013.01); *H04W 72/0413* (2013.01); *H04W 72/1268* (2013.01); *H04W 72/1284* (2013.01); *H04W 72/14* (2013.01)

(58) Field of Classification Search
  CPC ......... H04W 72/1268; H04W 72/0406; H04W 48/12
  See application file for complete search history.

(56) References Cited

U.S. PATENT DOCUMENTS

| 2015/0312074 | A1  | 10/2015 | Zhu et al.   |            |
|--------------|-----|---------|--------------|------------|
| 2015/0327245 | A1* | 11/2015 | Zhu          | H04W 72/02 |
|              |     |         |              | 370/329    |
| 2016/0128042 | A1  | 5/2016  | Choi et al.  |            |
| 2016/0269145 | A1  | 9/2016  | Ji et al.    |            |
| 2016/0353452 | A1  | 12/2016 | Chen et al.  |            |
| 2017/0012695 | A1  | 1/2017  | Kim et al.   |            |
| 2017/0034845 | A1* | 2/2017  | Liu          | H04L 1/0003 |
| 2017/0188352 | A1* | 6/2017  | Lee          | H04L 1/18  |
| 2017/0288817 | A1* | 10/2017 | Cao          | H04L 1/1812 |

OTHER PUBLICATIONS

Qualcomm Incorporated, "RSMA and SCMA comparison", 3GPP TSG-RAN WG1 #85, May 23-27, 2016, Nanjing, China, R1-164689.

* cited by examiner

FIG. 5

LATIN SQUARE MATRIX #0 → $\begin{array}{c} A \\ B \\ C \\ D \end{array} \begin{bmatrix} 0 & 1 & 2 & 3 \\ 1 & 0 & 3 & 2 \\ 2 & 3 & 0 & 1 \\ 3 & 2 & 1 & 0 \end{bmatrix}$ LATIN SQUARE MATRIX #1 → $\begin{array}{c} E \\ F \\ G \\ H \end{array} \begin{bmatrix} 0 & 2 & 3 & 1 \\ 1 & 3 & 2 & 0 \\ 2 & 0 & 1 & 3 \\ 3 & 1 & 0 & 2 \end{bmatrix}$ LATIN SQUARE MATRIX #2 → $\begin{array}{c} I \\ J \\ K \\ L \end{array} \begin{bmatrix} 0 & 3 & 1 & 2 \\ 1 & 2 & 0 & 3 \\ 2 & 1 & 3 & 0 \\ 3 & 0 & 2 & 1 \end{bmatrix}$

FIG. 6

|      | R(m)[0] | R(m)[1] | R(m)[2] | R(m)[3] |
|------|---------|---------|---------|---------|
| R(0) | 00      | 01      | 10      | 11      |
| R(1) | 01      | 00      | 11      | 10      |
| R(2) | 10      | 11      | 00      | 01      |
| R(3) | 11      | 10      | 01      | 00      |

FIG. 7

|      | R(m)[0] | R(m)[1] | R(m)[2] | R(m)[3] |
|------|---------|---------|---------|---------|
| R(4) | 00      | 10      | 11      | 01      |
| R(5) | 01      | 11      | 10      | 00      |
| R(6) | 10      | 00      | 01      | 11      |
| R(7) | 11      | 01      | 00      | 10      |

FIG. 8
|        | R(m)[0] | R(m)[1] | R(m)[2] | R(m)[3] |
|--------|---------|---------|---------|---------|
| R(8)   | 00      | 11      | 01      | 10      |
| R(9)   | 01      | 10      | 00      | 11      |
| R(10)  | 10      | 01      | 11      | 00      |
| R(11)  | 11      | 00      | 10      | 01      |
FIG. 9
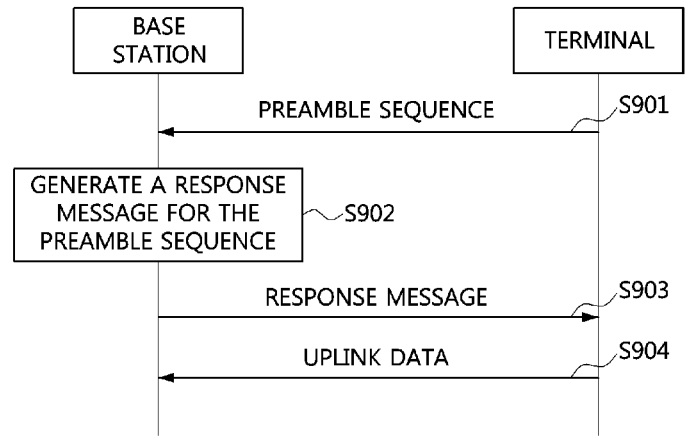
FIG. 10
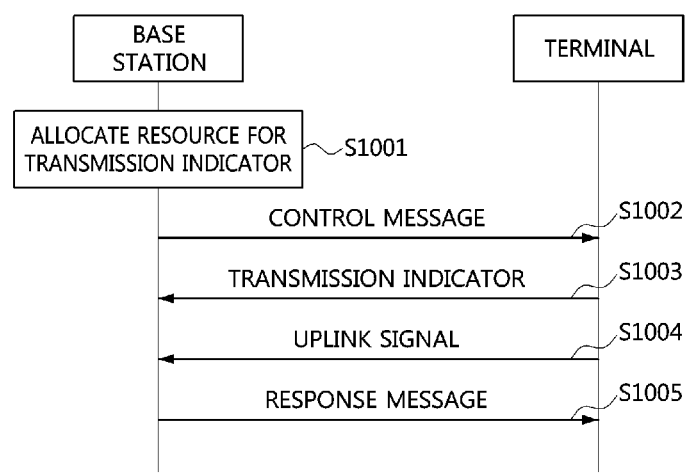

NON-ORTHOGONAL TRANSMISSION METHOD AND APPARATUS IN COMMUNICATION SYSTEM

CROSS-REFERENCE TO RELATED APPLICATIONS

This application claims priorities to Korean Patent Applications No. 10-2016-0144773 filed on Nov. 1, 2016 and No. 10-2017-0118934 filed on Sep. 15, 2017 in the Korean Intellectual Property Office (KIPO), the entire contents of which are hereby incorporated by reference.

BACKGROUND

1. Technical Field

The present disclosure relates to a non-orthogonal transmission technology for a communication system, and more specifically, to a non-orthogonal transmission technology which reduces complexity of a receiving end.

2. Related Art

A communication system may comprise a core network (e.g., a serving gateway (S-GW), a packet data network (PDN) gateway (P-GW), a mobility management entity (MME), etc.), a base station (e.g. a macro base station, a small base station, a relay, etc.), a terminal, and the like. Communications between the base station and the terminal may be performed using various radio access technologies (RATs) such as 4G communication technology, 5G communication technology, wireless broadband technology (Wi-Bro), wireless local area network (WLAN), wireless personal area network (WPAN) technology, etc.

When uplink data exist in the terminal, the terminal may transmit a message requesting uplink transmission scheduling to the base station. Then, the base station may receive the message requesting uplink transmission scheduling from the terminal, and transmit an uplink grant to the terminal in response to the message. When the uplink grant is received from the base station, the terminal may transmit uplink data to the base station using a resource allocated by the base station.

When autonomous transmission (e.g., non-orthogonal transmission) is supported in a communication system, a terminal may transmit uplink data to a base station without an uplink grant. For example, the terminal may select a resource in a preconfigured resource pool and transmit uplink data to the base station using the selected resource. Here, the preconfigured resource pool may be shared by the base station and a plurality of terminals. Since the terminal does not know resources used by other terminals, the resource selected by the terminal from the preconfigured resource pool may be overlapped with the resources used by other terminals. In this case, a plurality of terminals may transmit uplink data using the same resource, thereby causing a transmission collision.

Meanwhile, since the base station does not know the resource selected by the terminal from the preconfigured resource pool, the base station should monitor all resources belonging to the preconfigured resource pool in order to receive the uplink data from the terminal. Accordingly, complexity of a receiving end may be increased in the case that the autonomous transmission (e.g., non-orthogonal transmission) is performed.

SUMMARY

Accordingly, embodiments of the present disclosure provide a method and an apparatus for non-orthogonal transmission which can reduce complexity of a receiving end of a communication system.

In order to achieve the objective of the present disclosure, an operation method of a first terminal in a communication system may comprise receiving, from a base station, a control message including information on a resource allocated for a transmission indicator used for identifying the first terminal among a plurality of terminals performing uplink transmission; transmitting the transmission indicator to the base station using the resource allocated for the transmission indicator; and after transmitting the transmission indicator, transmitting an uplink signal to the base station using a preconfigured resource without an uplink grant.

The transmission indicator may be transmitted to the base station using an orthogonal resource allocated by the base station.

The control message may further include information on a mapping relation between the resource allocated for the transmission indicator and the preconfigured resource, and the preconfigured resource may be indicated by the mapping relation.

The preconfigured resource may be a non-orthogonal resource configured based on a Latin square matrix.

The preconfigured resource may be selected from a resource pool configured between the base station and the first terminal.

The uplink signal may include data and a reference signal, and the reference signal may be generated based on a signature of the first terminal.

The operation method may further comprise receiving a response message for the uplink signal from the base station, wherein the control message further includes information on a mapping relation between the resource allocated for the transmission indicator and a resource allocated for the response message, and the response message is received through the resource allocated for the response message indicated by the mapping relation.

In order to achieve the objective of the present disclosure, an operation method of a base station in a communication system may comprise configuring resources for transmission indicators used for respectively identifying a plurality of terminals performing uplink transmission; transmitting a control message including information on a resource allocated for a first transmission indicator for a first terminal to the first terminal among the plurality of terminals; receiving the first transmission indicator from the first terminal through the resource allocated for the first transmission indicator; and after receiving the first transmission indicator, performing a monitoring operation on a preconfigured resource between the base station and the first terminal to receive a first uplink signal of the first terminal.

The resources for transmission indicators may be configured as orthogonal resources.

The control message may further include information on a mapping relation between the resource allocated for the first transmission indicator and the preconfigured resource, and the preconfigured resource may be indicated by the mapping relation.

The preconfigured resource may be a non-orthogonal resource configured based on a Latin square matrix.

The first uplink signal may include data and a reference signal, and the reference signal may be generated based on a signature of the first terminal.

The operation method may further comprise identifying the first terminal using a reference signal included in the first uplink signal when the first uplink signal is received through the monitoring operation; estimating a channel state between the base station and the identified first terminal; and performing a demodulation and decoding operation on data included in the first uplink signal based on the estimated channel state.

The operation method may further comprise, after successfully receiving the first uplink signal through the monitoring operation, transmitting a first response message for the first uplink signal to the first terminal.

The control message may further include information on a mapping relation between the resource allocated for the first transmission indicator and a resource allocated for the first response message, and the first response message may be received through a resource indicated by the mapping relation.

In order to achieve the objective of the present disclosure, a first terminal in a communication system may comprise a processor and a memory storing at least one instruction executed by the processor. Also, the at least one instruction may be configured to receive, from a base station, a control message including information on a resource allocated for a transmission indicator used for identifying the first terminal among a plurality of terminals performing uplink transmission; transmit the transmission indicator to the base station using the resource allocated for the transmission indicator; and after transmitting the transmission indicator, transmit a first uplink signal to the base station using a preconfigured resource without an uplink grant.

The transmission indicator may be transmitted to the base station using an orthogonal resource allocated by the base station.

The control message may further include information on a mapping relation between the resource allocated for the transmission indicator and the preconfigured resource, and the preconfigured resource may be indicated by the mapping relation.

The preconfigured resource may be a non-orthogonal resource configured based on a Latin square matrix.

The at least one instruction may be further configure to receive a response message for the uplink signal from the base station, wherein the control message further includes information on a mapping relation between the resource allocated for the transmission indicator and a resource allocated for the response message, and the response message is received through the resource allocated for the response message indicated by the mapping relation.

According to the embodiments of the present disclosure, after transmitting a preamble sequence to a base station, a terminal can transmit uplink data to the base station using a non-orthogonal resource allocated by the base station. In this case, the base station can identify the terminal to perform uplink transmission based on the preamble sequence received from the terminal, allocate a non-orthogonal resource used for uplink transmission to the terminal, and receive the uplink data from the terminal.

Alternatively, after transmitting a message including a transmission indicator to the base station, the terminal may transmit uplink data to the base station using a non-orthogonal resource mapped to the transmission indicator. In this case, the base station can identify the terminal to perform the uplink transmission based on the transmission indicator received from the terminal, and receive the uplink data from the terminal through the non-orthogonal resource mapped to the transmission indicator. Therefore, the reception complexity of the uplink data can be reduced in the base station, and the performance of the communication system can be improved.

BRIEF DESCRIPTION OF DRAWINGS

Embodiments of the present disclosure will become more apparent by describing in detail embodiments of the present disclosure with reference to the accompanying drawings, in which:

FIG. 5 is a conceptual diagram illustrating a first embodiment of a 4×4 Latin square matrix;

FIG. 6 is a conceptual diagram illustrating a first embodiment of a Latin square matrix when defined as q=0;

FIG. 7 is a conceptual diagram illustrating a first embodiment of a Latin square matrix when defined as q=1;

FIG. 8 is a conceptual diagram illustrating a first embodiment of a Latin square matrix when defined as q=2.

FIG. 9 is a flow chart for explaining a first embodiment of an uplink transmission method in a communication system;

FIG. 10 is a flow chart for explaining a second embodiment of an uplink transmission method in a communication system.

DETAILED DESCRIPTION

Figure 1:
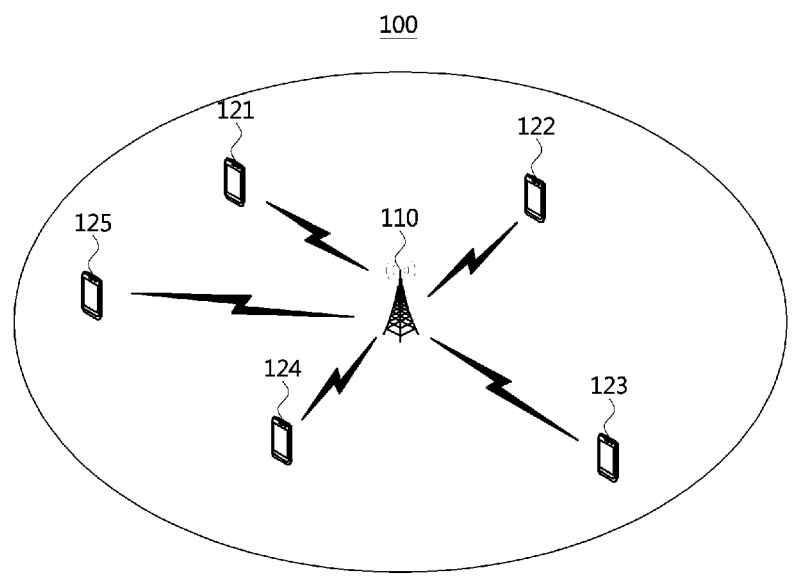
FIG. 1 is a conceptual diagram illustrating a first embodiment of a communication system.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

Hereinafter, wireless communication networks to which exemplary embodiments according to the present disclosure will be described. However, wireless communication networks to which exemplary embodiments according to the present disclosure are applied are not restricted to what will be described below. That is, exemplary embodiments according to the present disclosure may be applied to various wireless communication networks.

FIG. 1 is a conceptual diagram illustrating a first embodiment of a communication system.

Referring to FIG. 1, a communication system 100 may comprise a plurality of communication nodes 110, 121, 122, 123, 124, and 125. Also, the communication system 100 may comprise a core network (e.g., a serving gateway (S-GW), a packet data network (PDN) gateway (P-GW), a mobility management entity (MME), and the like). The plurality of communication nodes may support $4^{th}$ generation (4G) communication (e.g., long term evolution (LTE), LTE-advanced (LTE-A)), or $5^{th}$ generation (5G) communication defined in the $3^{rd}$ generation partnership project (3GPP) standard.

For example, the plurality of communication nodes may support at least one communication protocol among a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, and a space division multiple access (SDMA) based communication protocol.

Meanwhile, each of the plurality of communication nodes may have the following structure.

Figure 2:
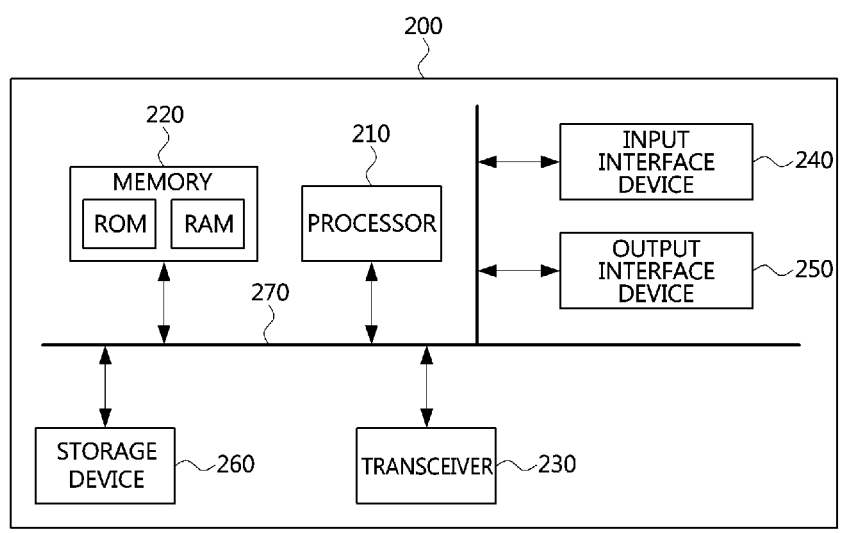
FIG. 2 is a block diagram illustrating a first embodiment of a communication node constituting a communication system.

FIG. 2 is a block diagram illustrating a first embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, in the communication system 100, the base station 110 may form a macro cell or a small cell, and may be connected to the core network through an ideal backhaul or a non-ideal backhaul. The base station 110 may transmit signals received from the core network to the corresponding terminals 121, 122, 123, 124 and 125, and transmit signals received from the terminals 121, 122, 123, 124, and 125 to the core network. The plurality of terminals 121, 122, 123, 124, and 125 may belong to the cell coverage of the base station 110. The plurality of terminals 121, 122, 123, 124 and 125 may be connected to the base station 110 by performing a connection establishment procedure with the base station 110. The plurality of terminals 121, 122, 123, 124, and 125 may communicate with the base station 110 after being connected to the base station 110.

Also, the base station 110 may perform multiple-input multiple-output (MIMO) transmission (e.g., single user (SU) MIMO, multi user (MU) MIMO, massive MIMO etc.), coordinated multipoint (CoMP) transmission, carrier aggregation (CA) transmission, unlicensed band transmission, device-to-device communication (D2D) (or proximity services (ProSe)), and the like. Each of the plurality of terminals 121, 122, 123, 124, and 125 may perform an operation corresponding to the base station 110, an operation supported by the base station 110, and the like.

The base station 110 may also be referred to as a Node B, an evolved Node B (eNB), a base transceiver station (BTS), a radio remote head (RRH), a transmission reception point (TRP), a radio unit (RU), a roadside unit (RSU), a radio transceiver, an access point, an access node, or the like. Each of the plurality of terminals 121, 122, 123, 124 and 125 may also be referred to as a terminal, a user equipment (UE), an access terminal, a mobile terminal, a station, a subscriber station, a mobile station, a portable subscriber station, a node, a device, an on-broad unit (OBU), or the like.

Meanwhile, when autonomous transmission (e.g., non-orthogonal transmission) is supported in a communication system, a terminal may transmit uplink data to a base station without an uplink grant. For example, the terminal may select a resource in a preconfigured resource pool and transmit uplink data to the base station using the selected resource. Here, the preconfigured resource pool may be shared by the base station and a plurality of terminals. Since the terminal does not know resources used by other terminals, the resource selected by the terminal in the preconfigured resource pool may be overlapped with the resources used by the other terminals. In this case, a plurality of terminals may transmit uplink data using the same resource, thereby causing a transmission collision.

The resource pool may include a plurality of orthogonal resources. When a plurality of terminals perform communications using orthogonal resources, interference may not occur due to orthogonality between resources. For example, in an OFDMA-based communication system, each of the subcarriers may be an orthogonal resource that does not cause interference. Alternatively, the resource pool may comprise a plurality of non-orthogonal resources. When a plurality of terminals perform communications using non-orthogonal resources, interference may occur due to non-orthogonality between resources. For example, in a CDMA-based communication system, a plurality of terminals may perform communications using the same time and frequency resources, in which case the same time and frequency resources may be non-orthogonal resources.

Meanwhile, in a communication system supporting autonomous transmission (e.g., non-orthogonal transmission), a terminal may perform communications using a resource selected from the resource pool. The maximum number of orthogonal resources generated based on the resources belonging to the resource pool may be determined according to the size of resources belonging to the resource pool, and the maximum number of non-orthogonal resources generated based on the resources belonging to the resource pool may be larger than the number of orthogonal resources. In this case, when a case that the terminal selects an arbitrary orthogonal resource among the orthogonal resources in the resource pool (hereinafter referred to as 'orthogonal resource selection scheme') is compared with a case that the terminal selects an arbitrary non-orthogonal resource in the resource pool (hereinafter referred to as 'non-orthogonal resource selection scheme'), a probability that a plurality of terminals select the same resource may be higher in the orthogonal resource selection scheme than in the non-orthogonal resource selection scheme.

In the case of a 'resource collision' in which a plurality of terminals select the same resource from the resource pool, it may be difficult for the base station to distinguish signals of the plurality of terminals received through the same resource, and thus it may be difficult to estimate respective channels for the plurality of terminals. In this case, the probability that the uplink data of each of the plurality of terminals is successfully decoded at the base station may be low. Therefore, when a resource collision occurs, the performance of the communication system may deteriorate, so that it is preferable that resource collisions do not occur as much as possible. Since the number of non-orthogonal resources in the resource pool is greater than the number of orthogonal resources, it may be advantageous to use the non-orthogonal resource selection scheme rather than the orthogonal resource selection scheme in terms of performance of the communication system.

Also, it may be advantageous to use the non-orthogonal resource selection scheme rather than the orthogonal resource selection scheme in terms of frequency utilization efficiency of a communication system. When the non-orthogonal resource selection scheme is used, a higher performance can be achieved as compared with the orthogonal resource selection scheme by eliminating mutual interference between terminals at a base station. In an environment where mutual interference exists between terminals, a terminal may transmit an uplink signal using a channel coding scheme with a low code rate so that a base station can easily detect the uplink signal of the terminal. The base station may remove the detected uplink signal of the terminal from the entire uplink signal, and then detect uplink signals of other terminals.

However, when the terminal performs uplink transmission using the non-orthogonal resource selected from the resource pool, the base station should perform blind detection on non-orthogonal resources that the terminal can select. Also, the greater the number of non-orthogonal resources the terminal can select, the more the base station should perform blind detections. Therefore, the complexity of the base station (e.g., complexity of a receiver included in the base station) may be increased.

Next, embodiments for reducing the receiver complexity in a communication system supporting an autonomous transmission (e.g., non-orthogonal transmission) will be described. In the embodiments described below, the preconfigured resource pool may include at least one of orthogonal resources and non-orthogonal resources, and the preconfigured resource pool may be shared by the base station and the terminal, and communications between the base station and the terminal may be performed using the preconfigured resource pool. The terminal may be in a state of having acquired uplink synchronization with the base station, or in a state of not having acquired uplink synchronization with the base station. The terminal that has not acquired the uplink synchronization with the base station may perform a process of acquiring uplink synchronization in order to perform communications based on the preconfigured resource pool. The resource used for uplink communications (e.g., orthogonal resources or non-orthogonal resources within the preconfigured resource pool) may be allocated by the base station or selected by the terminal.

Also, in the embodiments described below, even when a method (e.g., transmission or reception of a signal) performed by a communication node #1 among communication nodes is described, a counterpart communication node #2 may perform a method (e.g. reception or transmission of the signal) corresponding to the method performed by the communication node #1. That is, when the operation of the terminal is described, the corresponding base station may perform an operation corresponding to the operation of the terminal. Conversely, when the operation of the base station is described, the corresponding terminal may perform an operation corresponding to the operation of the base station.

Resource Pool Configuration

A resource pool may include at least one of orthogonal resources and non-orthogonal resources. If communications are performed using orthogonal resources (e.g., different time and frequency resources) selected from the resource pool, no interference may occur. On the other hand, if communications are performed using non-orthogonal resources (e.g., the same time and frequency resources) selected from the resource pool, interference may occur.

Communications may be performed using orthogonal resources when a traffic load of a cell is small, and communications may be performed using non-orthogonal resources when the traffic load of the cell is large. When the non-orthogonal resource selection scheme is used, the requirement in terms of performance of the communication system may be as follows.

Requirement: When considering signals of other terminals acting as interference to a terminal, the interfering terminals should be distributed not only to a specific terminal but also to a plurality of terminals.

The magnitude of the interference caused by the terminal may vary. In an environment where there is interference between terminals, whether or not the uplink signal is received at the base station may be determined based on a signal to interference plus noise ratio (SINR) of the uplink signal.

On the other hand, non-orthogonal resources may be allocated as follows.

Figure 3:
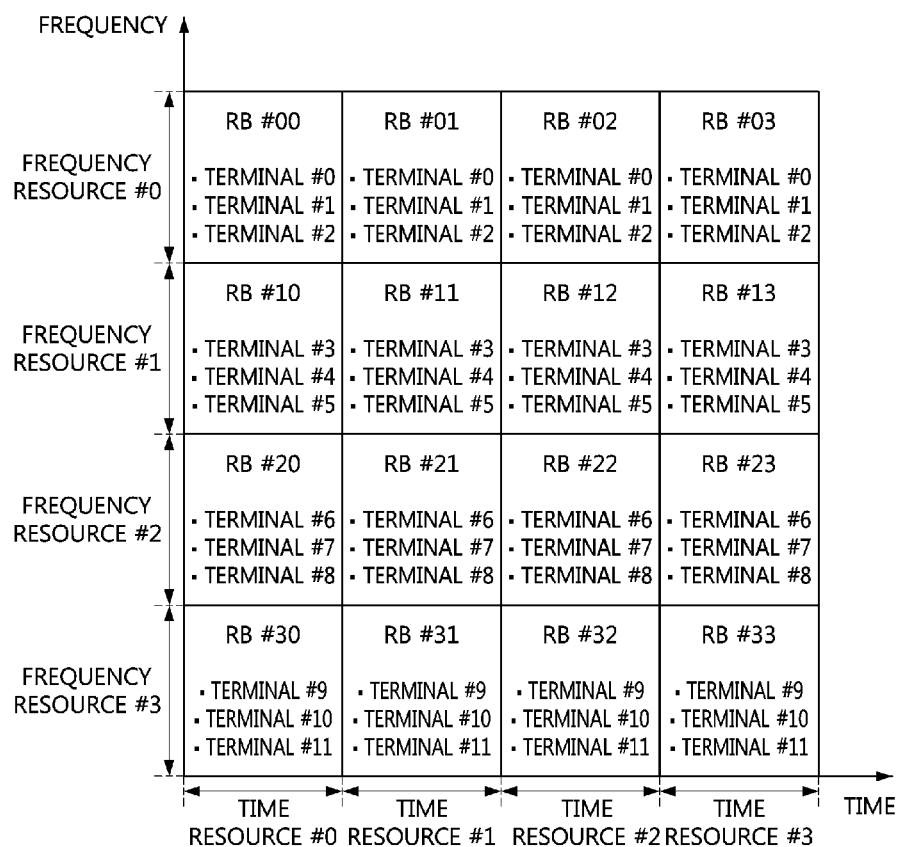
FIG. 3 is a conceptual diagram illustrating a first embodiment of non-orthogonal resources allocated to terminals in a communication system.

FIG. 3 is a conceptual diagram illustrating a first embodiment of non-orthogonal resources allocated to terminals in a communication system.

Referring to FIG. 3, a resource pool may include 16 resource blocks (RBs) (i.e., RBs #00 to #03, RBs #10 to #13, RBs #20 to #23, RBs #30 to #33) which may be used for uplink transmission of 12 terminals (i.e., terminals #0 to #11). The number of terminals allocated to the same RB may be 3 and the position of the frequency resource allocated for each of the 12 terminals (terminals #0 to #11) may not change with time.

For example, a frequency resource #0 may be allocated for terminals #0 to #2, a frequency resource #1 may be allocated for terminals #3 to #5, a frequency resource #2 may be allocated for terminals #6 to #8, and a frequency resource #3 may be allocated for terminals #9 to #11. In this case, a single terminal may receive interference from two terminals. For example, terminal #0 may receive interference from terminals #1 and #2, terminal #3 may receive interference from terminals #4 and #5, terminal #6 may receive interference from terminals #7 and #8, and terminal #9 may receive interference from terminals #10 and #11.

Figure 4:
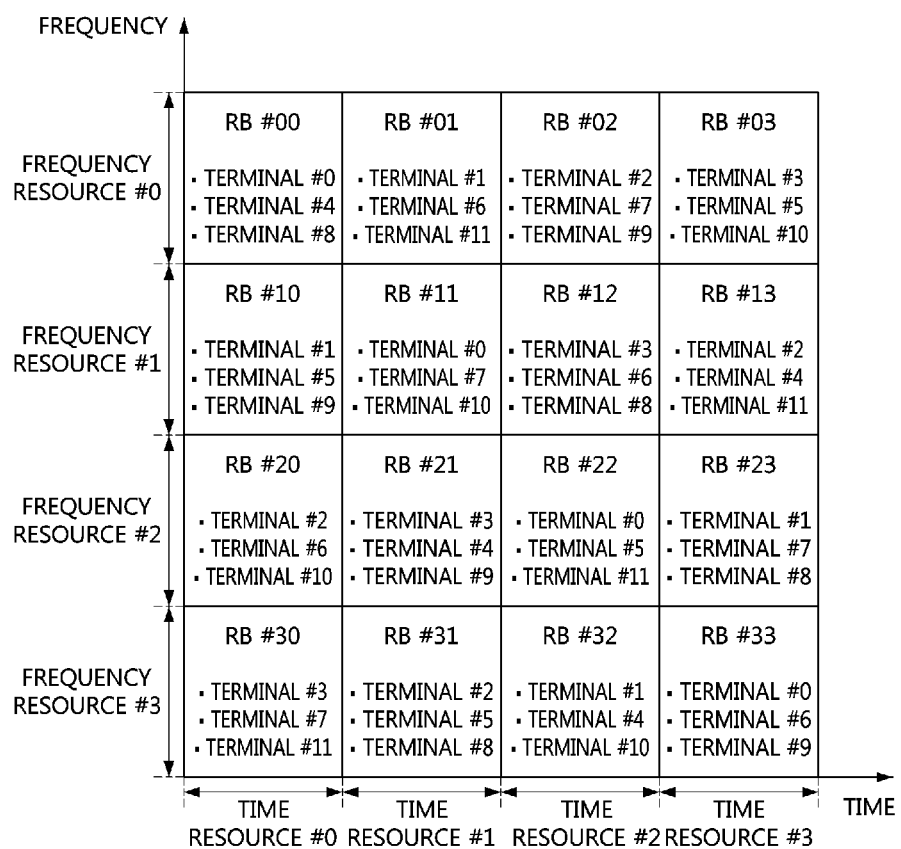
FIG. 4 is a conceptual diagram illustrating a second embodiment of non-orthogonal resources allocated to terminals in a communication system.

FIG. 4 is a conceptual diagram illustrating a second embodiment of non-orthogonal resources allocated to terminals in a communication system.

Referring to FIG. 4, a resource pool may include 16 RBs (i.e., RBs #00 to #03, RBs #10 to #13, RBs #20 to #23, RBs #30 to #33) which may be used for uplink transmission of 12 terminals (i.e., terminals #0 to #11). The number of terminals allocated to the same RB may be 3 and the position of the frequency resource allocated for each of the 12 terminals (terminals #0 to #11) may change with time.

For example, each of the 12 terminals (terminals #0 to #11) may use four frequency resources. In this case, a single terminal may receive interference from 8 terminals. For example, terminal #0 in RB #00 may receive interference from terminals #4 and #8, terminal #0 in RB #11 may receive interference from terminals #7 and #10, terminal #0 in RB #22 may receive interference from terminals #5 and #11, and terminal #0 in the RB #33 may receive interference from terminals #6 and #9.

The resource allocation scheme shown in FIG. 4 may be advantageous in terms of frequency diversity and inter-terminal interference randomization as compared to the resource allocation scheme shown in FIG. 3. For example, in a channel environment in which short-term fading exists, when the resources allocated to a terminal are distributed widely in the frequency domain, the probability that the terminal's signal experiences a bad channel is reduced due to the frequency diversity. Also, in terms of the inter-terminal interference randomization, the greater the number of terminals causing interference to one terminal, the lower the probability that the one terminal receives large interference.

In order to allocate resources as shown in FIG. 4, a Latin square matrix may be used. The features of a Latin square matrix having an N×N size (hereinafter referred to as 'N×N Latin square matrix') may be as follows. Here, N may be an integer of 1 or larger.

Feature 1: Elements that make up each row of the Latin square matrix may have a value of 0, 1, . . . , and (N−1), and elements in the same row of the Latin square matrix may have different values. For example, in the same row of the Latin square matrix, each of 0, 1, . . . , and (N−1) may be present once.

Feature 2: Elements constituting each column of the Latin square matrix may have a value of 0, 1, . . . , and (N−1), and elements in the same column of the Latin square matrix may have different values. For example, in the same column of a Latin square matrix, each of 0, 1, . . . , and (N−1) may be present once.

Feature 3: When comparing two rows in a Latin square matrix, the elements in the same column in two rows may have different values.

Feature 4: When comparing two columns in a Latin square, the elements in the same row in two columns may have different values.

When a cyclic shift is performed on the columns other than the first column in a symmetric N×N Latin square matrix having a natural order, matrices having a size of N×N may be generated. Since one matrix may be generated each time a cyclic shift is performed, (N−2) matrices may be additionally generated by performing cyclic shifts. The matrices generated by the cyclic shift may have the features of the Latin square matrix described above. For example, the matrices generated by the cyclic shift may also be a Latin square matrix. Accordingly, the total number of Latin square matrices may be (N−1).

(N−1) Latin square matrices may additionally have the following features.

Feature 5: When comparing two rows in different Latin square matrices, values of elements may be the same in only one column of N columns of the two rows.

Feature 6: When comparing two columns in different Latin square matrices, values of elements may be the same in only one row of N rows of the two columns.

N×(N−1) rows may be obtained from (N−1) Latin square matrices, and when two rows among the N×(N−1) rows are compared, a case that values of elements in the same column are the same occurs only once. In case that N=4, the Latin square matrix may be as follows.

FIG. 5 is a conceptual diagram illustrating a first embodiment of a 4×4 Latin square matrix.

Referring to FIG. 5, Latin square matrixes #0, #1, and #2 satisfy the above-described features 1 to 6. The value of an element in the Latin square matrix may represent the position of the frequency resource. For example, an element set to '0' may indicate the frequency resource #0 in FIG. 3 or 4, an element set to '1' may indicate the frequency resource #1 in FIG. 3 or 4, an element set to '2' may indicate the frequency resource #2 in FIG. 3 or 4, and an element set to '3' may indicate the frequency resource #3 in FIG. 3 or 4.

In the Latin square matrix, a column may represent the position of the time resource. For example, the first column in the Latin square matrix may correspond to the time resource #0 in FIG. 3 or 4, the second column in the Latin square matrix may correspond to the time resource #1 in FIG. 3 or 4, the third column in the Latin square matrix may correspond to the time resource #2 in FIG. 3 or 4, and the fourth column in the Latin square matrix may correspond to the time resource #3 in FIG. 3 or 4.

The resource allocated to the terminal may be represented by one row belonging to one Latin square matrix. For example, the resource allocated to terminal #0 in FIG. 4 may be represented by row #A (i.e., [0, 1, 2, 3]) of the Latin square matrix #0 in FIG. 5. In this case, terminal #0 may use the frequency resource #0 in the time resource #0, use the frequency resource #1 in the time resource #1, use the frequency resource #2 in the time resource #2, and use the frequency resource #3 in the time resource #3. Also, the resources allocated to terminal #10 in FIG. 4 may be represented by the row #K (i.e., [2, 1, 3, 0]) of the Latin square matrix #2 in FIG. 5. In this case, terminal #10 may use the frequency resource #2 in the time resource #0, use the frequency resource #1 in the time resource #1, use the frequency resource #3 in the time resource #2, and use the frequency resource #0 in the time resource #3. Therefore, the terminals #0 and #10 may use the same frequency resource #1 only in the time resource #1.

For example, in the time resource #0, terminal #0 may perform communications using the same frequency resource as terminals #4 and #8. In the time resource #1, terminal #0 may perform communications using the same frequency resource as terminals #7 and #10. In the time resource #2, terminal #0 may perform communications using the same frequency resource as terminals #5 and #11. Also, in the time resource #3, terminal #0 may perform communications using the same frequency resource as terminals #6 and #9. Therefore, each of terminals #0 to #11 may perform communications using time and frequency resources partially overlapping with eight different terminals in four time resources.

On the other hand, the Latin square matrix described above may be generated as follows. Each of the elements belonging to the vector R(m) having $2^n$ elements may be an integer within [0, $2^n-1$] when N is defined as $2^n$ in the N×N Latin square matrix. When R(m)[i] (i=0, 1, . . . , $2^n-1$) designates the i-th element constituting the vector R(m), a value of R(m)[i] (i=0, 1, . . . , $2^n-1$) may be represented as a binary value 'a(0)a(1)a(2) . . . a(n-1)' having n digits as shown in Equation 1 below.

$R(0)=(00 \ldots 0,000 \ldots 01,000 \ldots 10, \ldots ,111 \ldots 1)$ [Equation 1]

Meanwhile, when defined as $$q = \left\lfloor \frac{m}{2^n} \right\rfloor,$$

a value that q can have may be expressed by Equation 2 below.

$q=0,1,2,\ldots,$ or $(2^n-2)$ [Equation 2]

A method of calculating R(m)[i] (i=0, 1, . . . , $2^n-1$) according to q may be as follows. When defined as q=0, Equation 3 below may be obtained.

$R(m)[i]=m(\text{Bitwise\_XOR})R(0)[i], i=0,1,2,\ldots,2^n-1$ [Equation 3]

The operation Bitwise_XOR in Equation 3 may be defined as Equation 4 below.

In case that $A=a(0)a(1)a(2) \ldots a(n-1)$ and $B=b(0)b(1)b(2) \ldots b(n-1)$,

If $A$ (Bitwise_XOR)$B=C$ and $C=c(0)c(1)c(2) \ldots c(n-1)$, $c(i)=(a(i)+b(i)) \bmod 2 (i=0, \ldots ,n-1)$ [Equation 4]

When defined as q>0, Equation 5 below may be obtained.

$R(m)[0]=R(m \bmod 2^n)[0], i=0$ $R(m)[i]=R(m \bmod 2^n)[(i-1+q)\bmod(2^n-1)+1], i\geq 1$ [Equation 5]

R (m)[i] (i=0, 1, . . . , $2^n-1$) according to q may be obtained using the above described equations. R(m) may indicate the m-th row of the Latin square matrix obtained according to q.

When defined as n=2, the 4×4 Latin square matrices generated based on the above-described equations may be as shown in FIGS. 6 to 8.

FIG. 6 is a conceptual diagram illustrating a first embodiment of a Latin square matrix when defined as q=0, FIG. 7 is a conceptual diagram illustrating a first embodiment of a Latin square matrix when defined as q=1, and FIG. 8 is a conceptual diagram illustrating a first embodiment of a Latin square matrix when defined as q=2.

Referring to FIGS. 6 to 8, the 4×4 Latin square matrix of FIG. 6 may be the same as the Latin square matrix #0 of FIG. 5, the 4×4 Latin square matrix of FIG. 7 may be the same as the Latin square matrix #1 of FIG. 5, and the 4×4 Latin square matrix of FIG. 8 may be the same as the Latin square matrix #2 of FIG. 5. The value of the element of the Latin square matrix may indicate the position of the frequency resource in the resource pool, the column of the Latin square matrix may indicate the position of the time resource in the resource pool, and the resource allocated to each terminal may be represented by one row belonging to the Latin square matrix. In case that resources are allocated based on the rows having the same q (e.g., R(m)s with the same q), different frequency resources may be allocated to terminals in the same time resource. That is, the resources allocated based on the rows having the same q may be orthogonal resources.

In case that resources are allocated based on two rows having different q, the same frequency resource may be allocated to terminals in one time resource of the entire time resources. For example, the frequency resource allocated based on R(0) with q=0 may overlap with the frequency resource allocated based on the rows with q=1 or q=2 in only one time resource. When one RB is allocated for three terminals, one terminal may receive interference from eight different terminals in four time resources. That is, since (N-1) is the number of N×N Latin square matrices, (N-1) terminals may be allocated to the same frequency resource within one time resource, and may receive interference from N×(N-2) terminals.

Resource Allocation Method Based on Latin Square Matrix

On the other hand, the resources used for communications in the communication system may be configured by the base station or the terminal. The base station may allocate resources to the terminals considering the traffic load of the cell. Also, the base station may allocate orthogonal resources to the terminals preferentially in the resource pool, and allocate non-orthogonal resources to the terminals when orthogonal resources do not exist.

For example, since the resources indicated by the rows R(0), R(1), R(2), and R(3) in FIG. 6 are orthogonal resources, the base station may allocated the resources indicated by R(0), R(1), R(2), and R(3) to four terminals. When allocation of the resources indicated by the rows R(0), R(1), R(2), and R(3) in FIG. 6 is completed and resource allocation for four new terminals is required, the base station may allocate the resources indicated by R(4), R(5), R(6), and R(7) in FIG. 7 or the resources indicated by R(8), R(9), R(10), and R(11) in FIG. 8 to the four new terminals. In this case, each of the eight terminals may use the same frequency resource as one of the other terminals in each of the four time resources. That is, one terminal may receive interference from four different terminals in four time resources.

Meanwhile, the terminal may select a resource in the resource pool obtained from the base station, and may perform communications using the selected resource. For example, in case that the resource pool includes the resources indicated by the rows R(0), R(1), R(2), and R(3) in FIG. 6, the resources indicated by the rows R(4), R(5), R(6), and R(7) in FIG. 7, and the resources indicated by the rows R(8), R(9), R(10), and R(11) in FIG. 8, the terminal may perform communications using the resource indicated by one of the twelve rows R(0), R(1), R(2), R(3), R(4), R(5), R(6), R(7), R(8), R(9), R(10), and R(11).

Meanwhile, in the communication system, a transmission start time may be different for each terminal group. For example, a plurality of transmission start times may be configured, different transmission start times may be assigned to each terminal group, and a part or all of time and frequency resources allocated to terminal groups may overlap with each other. The base station may receive uplink signals from terminals at a specific transmission start time, and estimate occupation state of resources (e.g., the occupancy state of resources used for transmission of the uplink signals) based on the received uplink signals. Also, the base station may inform the terminals of the estimated occupation state. The terminal may obtain the occupation state from the base station, and select a resource in the resource pool in consideration of the occupation state. For example, if it is determined that there are many terminals using a specific resource based on the occupation state, the terminal may select a resource other than the specific resource from the resource pool.

Meanwhile, a plurality of terminals may select the same resource from the resource pool. Even when a plurality of terminals transmit the uplink signal using the same resource, the base station may estimate the channel of each of the plurality of terminals if a reference signal of each of the plurality of terminals can be distinguished. For example, when each of a plurality of terminals generates a reference signal using a randomly selected cyclic shift value, since reference signals of the plurality of terminals may be orthogonal to each other, the base station can distinguish the reference signals of the plurality of terminals. Therefore, even when the uplink signals of the plurality of terminals are received through the same resource, the base station may estimate the channel of each of the plurality of terminals using different reference signals.

In the following description, uplink transmission methods using resources configured based on the Latin square matrix described above will be described.

FIG. 9 is a flow chart for explaining a first embodiment of an uplink transmission method in a communication system.

Referring to FIG. 9, the communication system may include a base station, a terminal, and the like. Each of the base station and the terminal may be the same as the base station 100 and the terminals 121, 122, 123, 124, and 125. Also, each of the base station and the terminal may be configured similarly to the communication node 200 shown in FIG. 2. The terminal may receive a synchronization signal (e.g., a primary synchronization signal (PSS), or a secondary synchronization signal (SSS)) from the base station and acquire downlink synchronization of the base station based on the received synchronization signal. Further, the terminal may acquire system information (e.g., a master information block (MIB) and a system information block (SIB)) from the base station. However, the terminal may be in a state of not having acquired uplink synchronization with the base station.

If there is uplink data, the terminal may randomly select a preamble sequence in a preamble set including a plurality of preamble sequences, and transmit the selected preamble sequence to the base station (S901). Here, the preamble sequence may indicate that uplink data exists in the terminal. Information on the preamble set and uplink resource through which the preamble sequence is transmitted may be obtained through the system information of the base station.

The base station may receive the preamble sequence from the terminal. Upon receiving the preamble sequence, the base station may determine that uplink data exists in the terminal. Therefore, the base station may allocate a resource to be used for transmission of the uplink data. For example, the base station may allocate the resource to be used by the terminal from the resource pool including the resources indicated by the rows R(0), R(1), R(2), and R(3) in FIG. 6, the resources indicted by the rows R(4), R(5), R(6), and R(7) in FIG. 7, and the resource indicated by the rows R(8), R(9), R(10), and R(11) in FIG. 8. The base station may allocate an orthogonal resource to the terminal when orthogonal resources exist in the resource pool, and may allocate a non-orthogonal resource to the terminal when orthogonal resources do not exist in the resource pool.

The base station may generate a response message including resource allocation information (e.g., information indicating an orthogonal resource or a non-orthogonal resource allocated to the terminal) (S902). The response message may further include the preamble sequence, a timing advance (TA) value, and the like which were received from the terminal in the step S901. The base station may then transmit the response message to the terminal (S903). The terminal may receive the response message from the base station and compare the preamble sequence information included in the response message with the preamble sequence transmitted in the step S901. If the preamble sequence information included in the response message is the same as the preamble sequence transmitted in the step S901, the terminal may perform communications using the information included in the response message.

For example, the terminal may establish uplink synchronization with the base station using the TA value included in the response message. After the uplink synchronization with the base station is established, the terminal may transmit the uplink data to the base station using a resource (e.g., orthogonal resource or non-orthogonal resource) indicated by the resource allocation information included in the response message (S904). The base station may receive the uplink data from the terminal. When the uplink data of the terminal is transmitted through the orthogonal resource, the uplink data of the terminal may not interfere with other terminals. On the other hand, if the uplink data of the terminal is transmitted through the non-orthogonal resource, the uplink data of the terminal may interfere with the other terminals.

Meanwhile, the terminal may select a resource in the resource pool and perform uplink transmission using the selected resource. In order to receive the uplink signal of the terminal, the base station should perform detection for all terminals that are likely to perform uplink transmission using resources belonging to the resource pool. If the number of terminals to be detected is large, the reception complexity of the base station may increase. In order to solve this problem, the uplink transmission may be performed as follows.

FIG. 10 is a flow chart for explaining a second embodiment of an uplink transmission method in a communication system.

Referring to FIG. 10, the communication system may include a base station, a terminal, and the like. Each of the base station and the terminal may be the same as the base station 100 and the terminals 121, 122, 123, 124, and 125. Also, each of the base station and the terminal may be configured similarly to the communication node 200 shown in FIG. 2. The terminal may receive a synchronization signal (e.g., PSS or SSS) from the base station and acquire downlink synchronization of the base station based on the received synchronization signal. Further, the terminal may acquire system information (e.g., MIB and SIB) from the base station. However, the terminal may be in a state of not having acquired uplink synchronization with the base station.

In a communication procedure between the base station and the terminal, the resource pool composed of resources used for uplink transmission may be configured in advance, and the resource pool may be shared between the base station and the terminal. For example, the base station may configure the resource pool and inform the terminal of the preconfigured resource pool. Here, the resource pool may include the resources indicated by the rows R(0), R(1), R(2), and R(3) in FIG. 6, the resources indicted by the rows R(4), R(5), R(6), and R(7) in FIG. 7, and the resource indicated by the rows R(8), R(9), R(10), and R(11) in FIG. 8.

Also, in a communication procedure between the base station and the terminal, a transmission indicator for identifying the terminal to perform uplink transmission may be used. In this case, the base station may allocate resources used for transmission of the transmission indicator (S1001). For example, if there are N terminals in the cell coverage of the base station, the base station may allocate orthogonal resource for the transmission indicator of each of the N terminals. That is, a resource allocated for a transmission indicator of one terminal may be orthogonal to a resource allocated for a transmission indicator of another terminal. In addition, the resources allocated for the transmission indicator may be mapped to the resources used for uplink transmission in the resource pool, and the resources used for uplink transmission in the resource pool may be mapped to the resources allocated for response messages (e.g., an acknowledgment (ACK) indicator or a negative ACK (NACK) indicator) for the uplink transmission. The mapping relation among the resource for the transmission indicator, the resource for the uplink transmission and the resource for the response message may be as follows.

Figure 11:
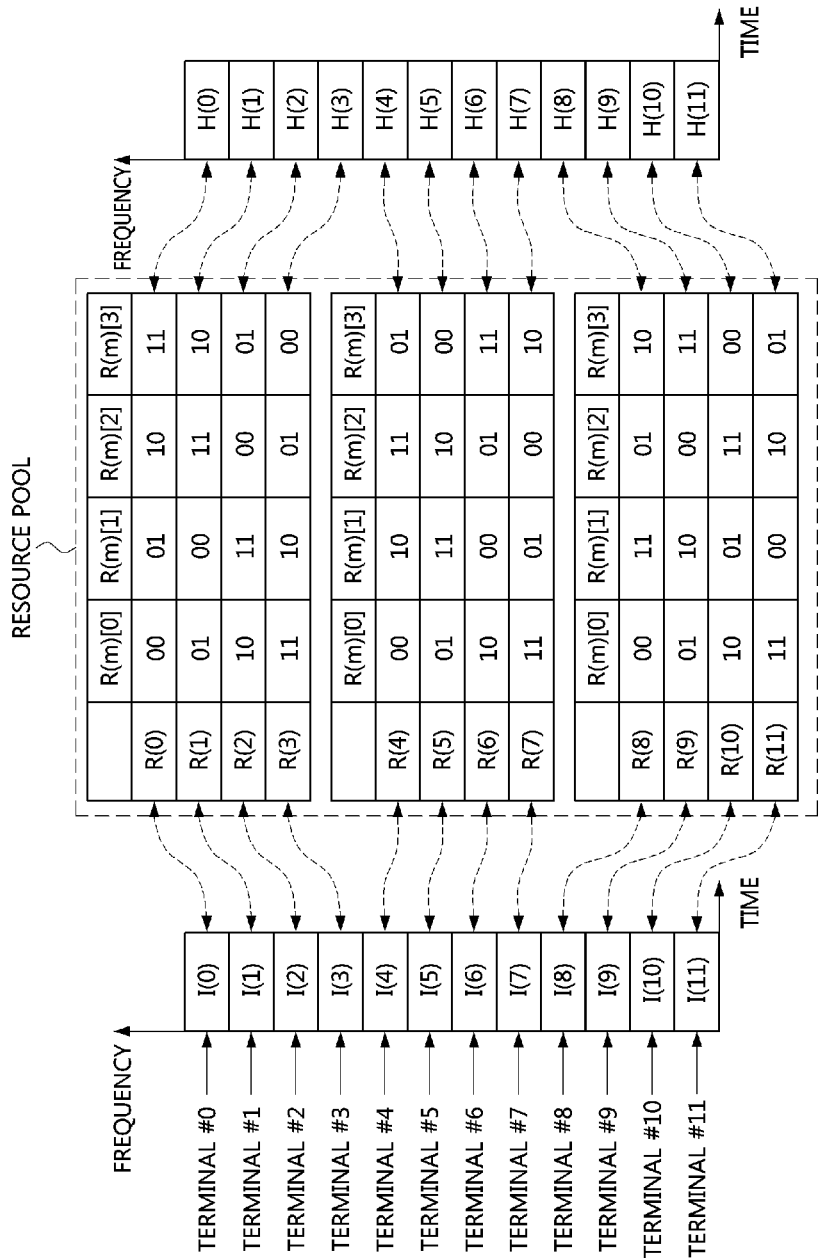
FIG. 11 is a conceptual diagram illustrating a first embodiment of a resource mapping relation in a communication system.

FIG. 11 is a conceptual diagram illustrating a first embodiment of a resource mapping relation in a communication system.

Referring to FIG. 11, resources for transmission indicators, uplink transmissions, and response messages of 12 terminals (terminals #0 to #11) may be allocated. Resources I(0) to I(11) for respective transmission indicator of the 12 terminals may be configured as orthogonal resources. For example, the transmission indicator of the terminal #0 may be transmitted via I(0), the transmission indicator of the terminal #1 may be transmitted via 41), the transmission indicator of the terminal #2 may be transmitted via I(2). Further, the transmission indicator of each of the terminals #3 to #11 may be transmitted through I(3) to I(11).

In the case that the resource pool includes the resources indicated by the rows R(0), R(1), R(2), and R(3) in FIG. 6, the resources indicted by the rows R(4), R(5), R(6), and R(7) in FIG. 7, and the resource indicated by the rows R(8), R(9), R(10), and R(11) in FIG. 8, I(0) can be mapped to the resource indicated by R(0) in the resource pool, I(1) may be mapped to the resource indicated by R(1) in the resource pool, and I(2) may be mapped to the resource indicated by R(2). Further, each of I(3) to I(11) may be mapped to each of the resources indicated by R(3) to R(11) in the resource pool. In this case, the terminal transmitting the transmission indicator through I(0) may transmit the uplink signal using the resource indicated by R(0) mapped to I(0).

Also, resources H(0) to H(11) for the response messages of the 12 terminals (terminals #0 to #11) may be configured as orthogonal resources and mapped to the resources for uplink transmission. For example, H(0) may be mapped to the resource indicated by R(0) in the resource pool, H(1) may be mapped to the resource indicated by R(1), and H(2) may be mapped to the resource indicated by R(2) in the resource pool. Further, each of H(3) to H(11) may be mapped to each of the resources indicated by R(3) to R(11) in the resource pool. In this case, the response message for the uplink signal transmitted through the resource indicated by R(0) may be received via H(0).

The mapping relation described above may be as shown in Table 1 below.

TABLE 1

| | Resource for transmission indicator | Resource for uplink transmission | Resource for response message |
| --- | --- | --- | --- |
| Terminal #0 | I(0) | R(0) | H(0) |
| Terminal #1 | I(1) | R(1) | H(1) |
| Terminal #2 | I(2) | R(2) | H(2) |
| Terminal #3 | I(3) | R(3) | H(3) |
| Terminal #4 | I(4) | R(4) | H(4) |
| Terminal #5 | I(5) | R(5) | H(5) |
| Terminal #6 | I(6) | R(6) | H(6) |
| Terminal #7 | I(7) | R(7) | H(7) |
| Terminal #8 | I(8) | R(8) | H(8) |
| Terminal #9 | I(9) | R(9) | H(9) |
| Terminal #10 | I(10) | R(10) | H(10) |
| Terminal #11 | I(11) | R(11) | H(11) |

Referring again to FIG. 10, the base station may transmit a control message including information indicating a resource allocated for a transmission indicator, information indicating a resource mapping relation (e.g., the mapping relation shown in FIG. 11, the mapping table in Table 1), and the like (S1002). The terminal may receive the control message from the base station and identify the information included in the control message (e.g., resource allocation information of the transmission indicator, resource mapping relation information). The terminal may transmit the transmission indicator to the base station using the resource indicated by the control message (S1003). For example, if the terminal is the terminal #0 in FIG. 11 or Table 1, the terminal may transmit the transmission indicator to the base station using I(0). The transmission indicator may be transmitted in the same or similar manner as the physical uplink control channel (PUCCH) format 1.

The base station may receive the transmission indicator from the terminal through the pre-allocated resource (e.g., the resource allocated in the step S1001), and determine that uplink transmission is to be performed by the terminal corresponding to the received transmission indicator (i.e., the resource through which the transmission indicator). Accordingly, the base station may perform a monitoring operation on the resource allocated for the uplink transmission in order to receive the uplink signal of the terminal.

The UE may identify the resource allocated for the uplink transmission based on the resource mapping relation indicated by the control message, and transmit the uplink signal to the base station using the allocated resource (S1004). The uplink signal may include data, a reference signal (e.g., a demodulation reference signal (DMRS)), and the like. When the resource allocated to the terminal is the resource allocated to the terminal #0 in FIG. 11 or Table 1, the terminal may transmit the uplink signal to the base station using the resource indicated by R(0) in the resource pool. Here, the resource indicated by R(0) may be a unique signature of the terminal.

The reference signal included in the uplink signal may be used for demodulating the data included in the uplink signal. The reference signal may be generated based on the terminal's unique signature (e.g., a unique sequence, a unique hopping pattern, a unique interleaving pattern). The unique signature may be mapped to an identifier, the transmission indicator, the uplink resource, and the like of the terminal. The unique signature may be configured by the base station or the terminal. Since each of the plurality of terminals performing uplink transmission has different unique signatures, the base station may identify the plurality of terminals using their unique signatures. That is, since the reference signals of the plurality of terminals have different sequences, the base station may identify the plurality of terminals using the reference signals.

The base station may receive the uplink signal and identify the terminal that transmitted the uplink signal using the unique signature. For example, when the uplink signal is received through the resource indicated by R(0) in the resource pool of FIG. 11 or Table 1, the base station may determine that the terminal that transmitted the uplink signal is terminal #0. Also, the base station may identify the unique signature based on the reference signal included in the uplink signal, and identify the terminal based on the unique signature.

The base station may estimate a channel state between the base station and the identified terminal using the reference signal and perform demodulation and decoding operations on the data included in the uplink signal based on the estimated channel state. When the demodulation and decoding operation is completed, the base station may generate a response message for the uplink signal. The response message may include at least one of the identifier (e.g., the unique signature) of the terminal that transmitted the uplink signal and one of the ACK/NACK indicators. For example, when the terminal that transmitted the uplink signal is the terminal #0 in FIG. 11 or Table 1, the response message may include the identifier (e.g., the unique signature) of the terminal #0. If the uplink signal is successfully received, the response message may include an ACK indicator, and if the uplink signal fails to be received, the response message may include a NACK indicator.

The base station may transmit the response message to the uplink signal to the terminal (S1005). In this case, the base station may transmit the response message via the resource allocated to the terminal (e.g., the resource indicated by the control message of the step S1002). For example, when the uplink signal is received through the resource indicated by R(0) in FIG. 11 or Table 1, the base station may transmit the response message for the uplink signal to the terminal #0 using H(0).

After transmitting the uplink signal, the terminal may perform a monitoring operation on the preconfigured resource in order to receive the response message. For example, when the terminal transmits the uplink signal through the resource indicated by R(0) in the resource pool of FIG. 11 or Table 1, the terminal may perform the monitoring operation on H(0). When a signal having a strength less than a predetermined threshold value is detected as a result of the monitoring operation on the preconfigured resource, the terminal may determine that the response message for the uplink signal has not been received through the preconfigured resource. Therefore, the terminal may determine that the uplink signal has not been successfully received at the base station, and may perform a retransmission operation for the uplink signal.

On the other hand, when a signal having a strength equal to or higher than the predetermined threshold value is detected as the result of the monitoring operation on the preconfigured resource, the terminal may determine that the response message for the uplink signal has been received through the preconfigured resource, and identify the ACK or NACK indicator included in the received response message. If the ACK indicator is included in the response message, the terminal may determine that the uplink signal has been successfully received at the base station. If the NACK indicator is included in the response message, the terminal may determine that the uplink signal has not been received at the base station and may perform a retransmission operation for the uplink signal.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a first terminal in a communication system, comprising:

receiving, from a base station, a control message including a transmission indicator used for identifying the first terminal among a plurality of terminals performing uplink transmission, information on a first resource allocated for the transmission indicator, information on a preconfigured second resource mapped to the first resource, and information on a mapping relation of a third resource to the first resource, the third resource allocated for a response message from the base station;

transmitting the transmission indicator to the base station using the first resource allocated for the transmission indicator; and after transmitting the transmission indicator, transmitting, without an uplink grant from the base station, an uplink signal to the base station using the preconfigured second resource mapped to the first resource.

2. The operation method according to claim 1, wherein the transmission indicator is transmitted to the base station using an orthogonal resource allocated by the base station.

3. The operation method according to claim 1, wherein the control message further includes information on a mapping relation between the first resource allocated for the transmission indicator and the preconfigured second resource, and the preconfigured second resource is indicated by the mapping relation.

4. The operation method according to claim 1, wherein the preconfigured second resource is a non-orthogonal resource configured based on a Latin square matrix.

5. The operation method according to claim 1, wherein the preconfigured second resource is selected from a resource pool configured between the base station and the first terminal.

6. The operation method according to claim 1, wherein the uplink signal includes data and a reference signal, and the reference signal is generated based on a signature of the first terminal.

7. The operation method according to claim 1, further comprising receiving the response message for the uplink signal from the base station, wherein the the response message is received through the third resource allocated for the response message indicated by the mapping relation.

8. An operation method of a base station in a communication system, comprising:
configuring resources for transmission indicators used for respectively identifying a plurality of terminals performing uplink transmission;
transmitting to a first terminal among the plurality of terminals a control message including information on a first resource allocated for a first transmission indicator for the first terminal, information on a preconfigured second resource mapped to the first resource, and information on a mapping relation of a third resource to the first resource, the third resource allocated for a response message from the base station;
receiving the first transmission indicator from the first terminal through the first resource allocated for the first transmission indicator; and
after receiving the first transmission indicator, performing a monitoring operation on the preconfigured second resource between the base station and the first terminal to receive a first uplink signal of the first terminal.

9. The operation method according to claim 8, wherein the resources for transmission indicators are configured as orthogonal resources.

10. The operation method according to claim 8, wherein the control message further includes information on a mapping relation between the first resource allocated for the first transmission indicator and the preconfigured second resource, and the preconfigured second resource is indicated by the mapping relation.

11. The operation method according to claim 8, wherein the preconfigured second resource is a non-orthogonal resource configured based on a Latin square matrix.

12. The operation method according to claim 8, wherein the first uplink signal includes data and a reference signal, and the reference signal is generated based on a signature of the first terminal.

13. The operation method according to claim 8, further comprising:
identifying the first terminal using a reference signal included in the first uplink signal when the first uplink signal is received through the monitoring operation;
estimating a channel state between the base station and the identified first terminal; and
performing a demodulation and decoding operation on data included in the first uplink signal based on the estimated channel state.

14. The operation method according to claim 8, further comprising, after successfully receiving the first uplink signal through the monitoring operation, transmitting a first response message for the first uplink signal to the first terminal using the third resource.

15. The operation method according to claim 14, wherein the control message further includes information on a mapping relation between the first resource allocated for the first transmission indicator and the third resource allocated for the first response message, and the first response message is transmitted through a resource indicated by the mapping relation.

16. A first terminal in a communication system, comprising a processor and a memory storing at least one instruction executed by the processor, wherein the processor executing the at least one instruction is configured to:
receive, from a base station, a control message including information on a first resource allocated for a transmission indicator used for identifying the first terminal among a plurality of terminals performing uplink transmission, information on a mapping relation between the first resource and a preconfigured second resource for transmitting an uplink signal, and information on a mapping relation between the first resource and a third resource for receiving a response message for the uplink signal;
transmit the transmission indicator to the base station using the first resource allocated for the transmission indicator; and
after transmitting the transmission indicator, transmit a first uplink signal to the base station using the preconfigured second resource without an uplink grant.

17. The first terminal according to claim 16, wherein the transmission indicator is transmitted to the base station using an orthogonal resource allocated by the base station.

18. The first terminal according to claim 16, wherein the preconfigured resource is a non-orthogonal resource configured based on a Latin square matrix.

19. The first terminal according to claim 16, wherein the processor executing the at least one instruction is further configured to receive a response message for the uplink signal from the base station, wherein the response message is received through the third resource allocated for the response message.

* * * * *